US006254967B1

(12) United States Patent
Katwala

(10) Patent No.: US 6,254,967 B1
(45) Date of Patent: Jul. 3, 2001

(54) ELECTRICAL DEVICE, SUCH AS A PLUG OR A CONNECTOR, WITH NAMEPLATE, ESPECIALLY FOR HAZARDOUS LOCATIONS

(75) Inventor: Rajiv Dinesh Katwala, Milford, CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/038,941

(22) Filed: Mar. 12, 1998

(51) Int. Cl.[7] .................................................. B32B 1/00

(52) U.S. Cl. ........................ 428/187; 428/42.1; 428/66.5; 428/66.7; 428/174; 428/195; 428/213

(58) Field of Search .................................. 428/195, 42.1, 428/53, 54, 66.5, 66.7, 174, 187, 213

(56) References Cited

U.S. PATENT DOCUMENTS

| | | | |
|---|---|---|---|
| 5,348,780 * | 9/1994 | Boggs et al. | 428/42 |
| 5,358,429 | 10/1994 | Mina | 439/695 |
| 5,658,648 | 8/1997 | Doerr et al. | 428/195 |

OTHER PUBLICATIONS

Catalog of Hubbell Incorporated entitled "Wiring Devices & Systems KELLEMS® Wire Management Marine Wiring Products", 1995, pp. E–11 and F–5.

* cited by examiner

*Primary Examiner*—Cynthia Harris
*Assistant Examiner*—Dawn L. Garrett
(74) *Attorney, Agent, or Firm*—Joseph J. Buczynski; Jeffrey J. Howell

(57) ABSTRACT

An electrical device such as a plug or a connector has a housing with electrical contacts coupled thereto. The housing also has a nameplate permanently affixed thereto by adhesive and mechanical fasteners. The mechanical fasteners are attached to the housing, which is constructed of a plastic material, in such a manner that the plastic material of the housing completely conceals the metal fasteners or screws. In the preferred embodiment, the nameplate as a curved label section with adhesive on one side such that the nameplate can be secured to a frustoconical section of the housing. A pair of mounting tabs with mounting holes extend from one of the curved edges such that they may be bent or folded and then fastened to a hidden wall of the electrical connector housing. In the preferred embodiment, the electrical housing has a center section, with a shroud section coupled to one end and a cord clamping section coupled to another end. The mounting tabs of the nameplate are secured between the center section and the cord clamping section such that the mounting fasteners of the nameplate are completely enclosed within the non-conductive, dielectric materials forming the center section of the housing and the cord clamping section of the housing.

38 Claims, 4 Drawing Sheets

ELECTRICAL DEVICE, SUCH AS A PLUG OR A CONNECTOR, WITH NAMEPLATE, ESPECIALLY FOR HAZARDOUS LOCATIONS

BACKGROUND OF THE INVENTION

1. Field of the Invention

This invention generally relates to nameplates or labels for electrical devices such as plugs and connectors. More specifically, the present invention relates to nonmetallic nameplates or labels with product identifying information thereon for permanently securing to electrical plugs and connectors.

2. Background Information

Electrical plugs used to deliver electrical current from an energized receptacle to an electrical device, such as a motor, piece of machinery, etc., are well known in the art. Generally, they consist of a cable or cord containing two or more conductor wires that are attached to an equal number of terminals fixed in a connector housing. Once the plug is inserted into the receptacle, current travels through the conductor wires to the electrical device.

The wiring device industry continues to suffer from an excess of serious injuries to consumers caused by electrical shocks. Accordingly, manufacturers of electrical devices have been required to provide consumers with various information so that they may properly use the electrical plug or connector. This information is typically provided on either packaging or packing slips which are sold with the electrical plug or connector. The problem with putting such information only on the packaging and packing slips is that the packaging and packing slips are often discarded when the plug or connector is being coupled to an electrical cord or the like. According to the industry, it is required that the plug or connector be labeled with the information to allow the consumer to properly use the plug or connector. This has resulted in nameplates and the like being developed which are permanently fixed to the body or housing of the electrical device. For example, in the past, metal nameplates have been screwed to the housing of the electrical device to provide the appropriate information to the consumer. One problem with metal nameplates is that they conduct electricity which can be dangerous to the consumer in certain circumstances. Accordingly, it is desirable to avoid having metal located on the exterior of the housing.

In other prior electrical devices, the information to the consumers have been molded directly in the plastic housing of the device. By molding the information into the housing of the electrical device, the information is permanently affixed to the electrical device. The consumer will always have the information available to ensure proper use of the electrical device. However, since the indicia is molded with the housing of the electrical device, the indicia and housing typically have the same color. Therefore, it is often difficult to read the information that is molded into the housing of the electrical device. This can result in the consumer either misreading the information or failing to notice certain warnings. Failure to follow such warnings can result in the consumer being seriously injured due to improper use of the electrical device.

In view of the above, there exists a need for an improved method in which to permanently secure a nameplate or label to the housing to provide the consumer with sufficient information on the appropriate uses of the electrical device. This invention addresses this need in the art as well as other needs in the art which will become apparent to those skilled in the art from this disclosure.

SUMMARY OF THE INVENTION

One object of the present invention is to provide an electrical device with a nameplate which is permanently secured to the exterior of the electrical device to provide information to the consumer.

Another object of the present invention is to produce a non-metallic label which is mechanically fastened to the housing of the electrical device in such a manner that the mechanical fasteners are not exposed.

Another object of the present invention is to provide a nameplate which is relatively inexpensive and simple to manufacture.

The foregoing objects can basically be attained by providing a nameplate for an electrical device comprising a dielectric layer having a first side with product identifying indicia thereon, a second side for engaging the electrical device and at least one mounting hole extending between the first and second sides, the dielectric layer including a label section with the product identifying indicia thereon, a mounting section with the mounting hole being formed therein and folding section connecting the mounting section to the label section; and adhesive overlying the second side of the label section of the dielectric layer for attaching the dielectric layer to an exterior surface of the electrical device.

The foregoing objects can also be attained by providing an electrical device, comprising a housing adapted to be coupled to an electrical cord, and having an exterior surface; electrical contacts mounted within the housing and adapted to be coupled to electrical conductors of the electrical cord; and a nameplate coupled to the exterior surface of the housing, and having a dielectric layer with a first side with product identifying indicia thereon, second side with adhesive thereon and at least one mounting hole with a fastener extending therethrough, the housing being constructed to completely conceal the fastener.

Other objects, advantages and salient features of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
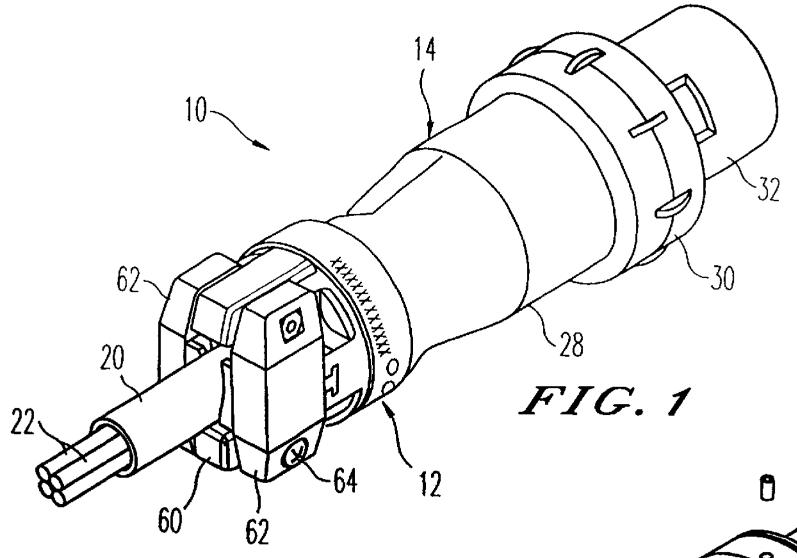
FIG. 1 is a rear end perspective view of an electrical plug with a nameplate or label coupled thereto in accordance with a first embodiment of the present invention.
Figure 2:
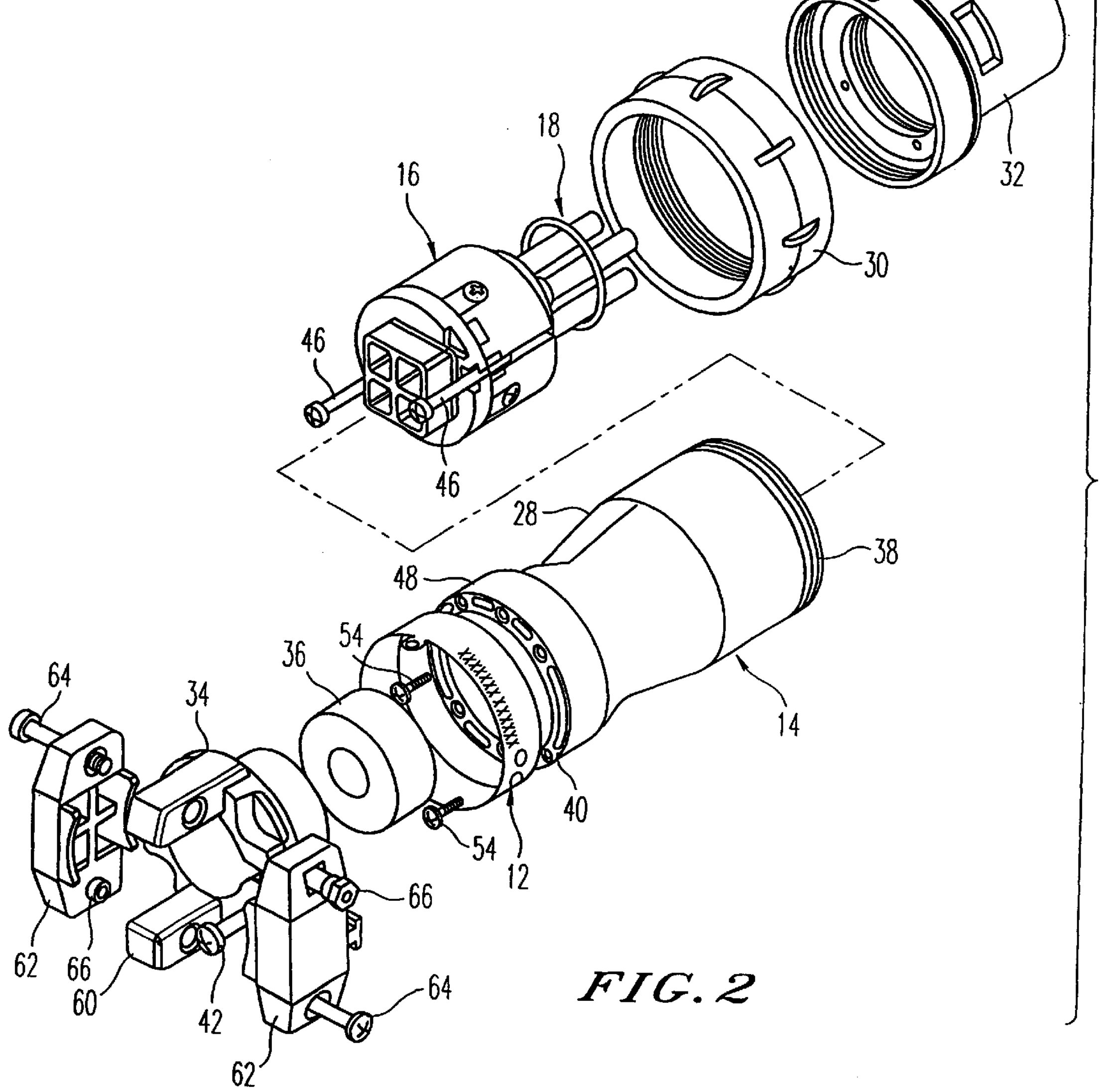
FIG. 2 is an exploded, rear perspective view of the electrical plug illustrated in FIG. 1.

Referring initially to FIGS. 1 and 2, an electrical plug 10 with a nameplate or label 12 is illustrated in accordance with a first embodiment of the present invention. Electrical plug 10 is especially designed for hazardous locations with nameplate 12 fixedly attached thereto. As discussed below, nameplate 12 is designed to be both adhesively and mechanically secured to electrical plug 10 so that the nameplate 12 is permanently secured thereto.

Basically, electrical plug 10 includes a housing 14, a contact retainer body 16 secured within housing 14 and a set of electrical contacts 18 retained within contact retainer body 16. Electrical plug 10 is adapted to be coupled to electrical cord 20 such that each conductor 22 of electrical cord 12 is coupled to one of the contacts 18 of electrical plug 10. Electrical plugs, such as electrical plug 10, are well known in the art. Therefore, electrical plug 10 will not be discussed and/or illustrated in detail herein. Moreover, the scope of the claims appended hereto should not be limited to the electrical plugs illustrated and discussed herein.

As seen in FIG. 2, housing 14 includes a tubular center section 28, a locking ring 30, a shroud section 32, a cord clamping section 34 and a moisture seal 36. Preferably, center section 28, locking ring 30 and cord clamping section 34 are constructed of non-conductive, dielectric materials such as a hard, rigid thermoset plastic material. The center section 28 is a tubular member having a first open end 38 and a second open end 40. First open end 38 has threads for screwing shroud section 32 thereto. Locking ring 30 can rotate on center section 28. Second open end 40 has cord clamping section 34 fixedly secured thereto via a pair of screws 42, only one seen in FIG. 2. The interior of center section 28 of the housing 14 has a cord receiving cavity for connecting conductors 22 to contacts 18. The exterior surface of center section 28 has an axially tapering surface 48, i.e., a frustoconical surface, located adjacent second open end 40. This frustoconical surface 48 forms a label receiving surface or area in which label or nameplate 12 is permanently secured thereto as discussed below.

Figure 3:
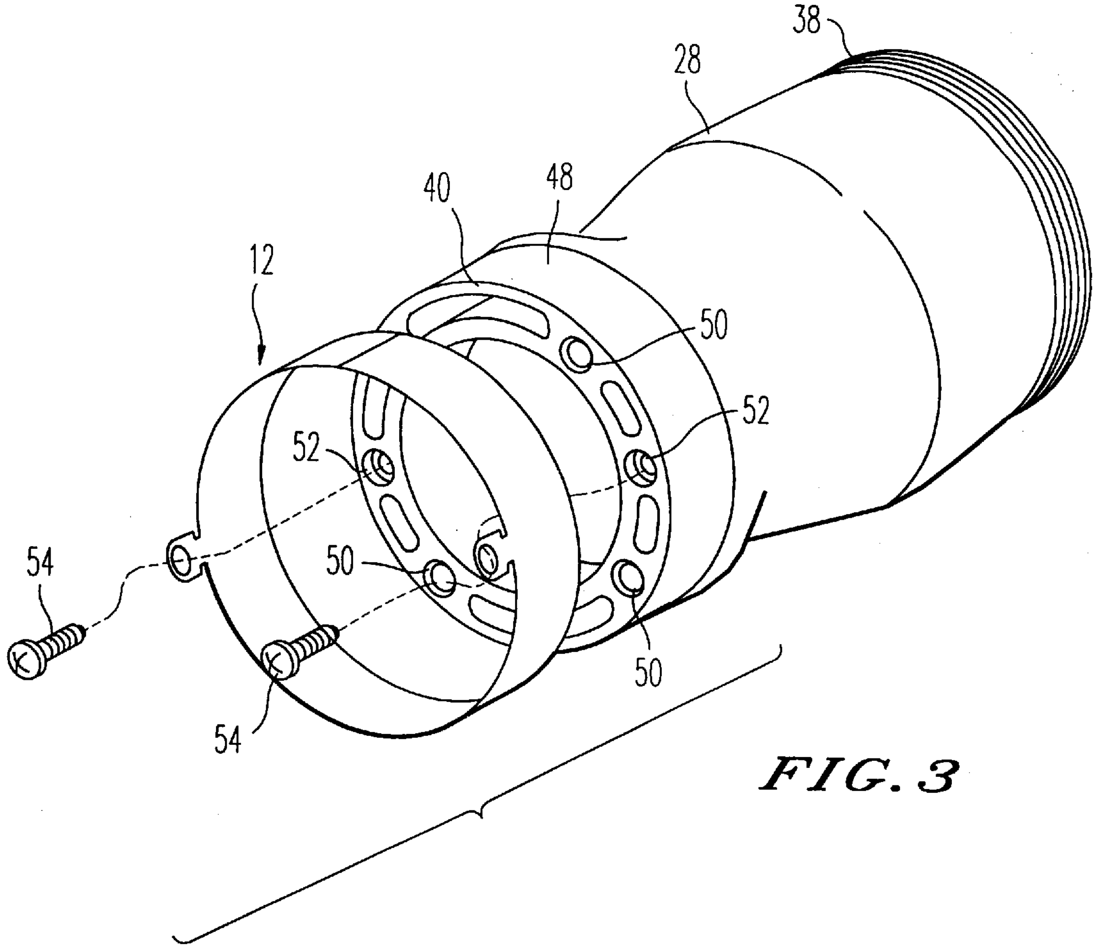
FIG. 3 is an enlarged, exploded perspective view of the center section of the housing, the nameplate and the fasteners for the electrical plug illustrated in FIGS. 1 and 2 or for the electrical connector illustrated in FIGS. 7 and 8.
Figure 4:
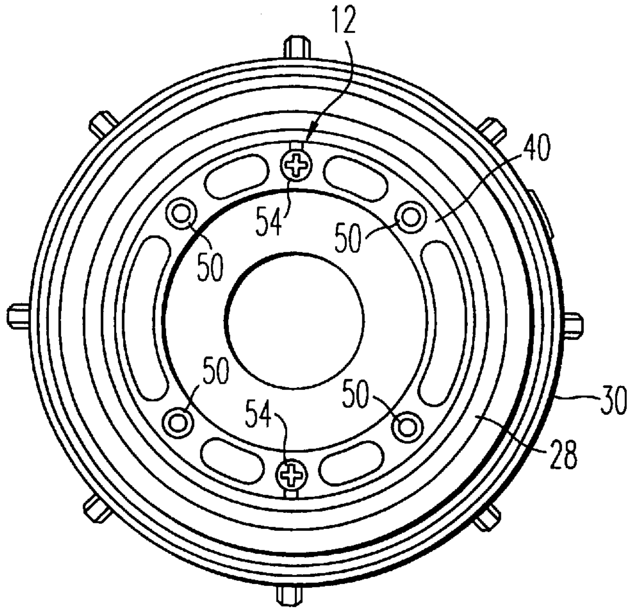
FIG. 4 is a left end elevational view of the center section of the housing for the electrical devices illustrated in FIGS. 1–3 and 7–8 with the nameplate coupled thereto.

As seen in FIGS. 3 and 4, second open end 40 of center section 28 has an end face with a first set of screw holes 50 for fixedly securing clamping section 34 thereto via screws 42, and a second set of screw holes 52 for securing nameplate 12 thereto. Preferably, a pair of metallic screws 54 are threaded into holes 52 for fixedly securing nameplate 12 thereto. When cord clamping section 34 is coupled to second end 40 of center section 28 of housing 14, screws 54 are completely encased by the plastic of center section 28 and the plastic of cord clamping section 34. Of course, screws 54 can be replaced with other types of fasteners, including but not limited to a frictionally retained pin.

Shroud section 32 is preferably a cylindrical member constructed of a conductive material such as aluminum. Shroud section 32 has one of its ends threaded for screwing to the first end 38 of center section 28 of housing 14. Shroud section 32 is designed to cover electrical contacts 18. Shroud section 32 of housing 14 has contact retainer body 16 coupled thereto by screws 46 when center section 28 and shroud section 32 are coupled together. Contact retainer body 16 is held within center section 28 by shroud section 32, while portions of contacts 18 are located within shroud section 32. Contact retainer body 16 and contacts 18 are relatively conventional parts which are well known in the art. Therefore, the construction of contact retainer body 16 and contacts 18 will not be discussed or illustrated in detail herein.

As seen in FIGS. 1 and 2, cord clamping section 34 is preferably constructed of a non-metallic, non-conductive, dielectric material such as a hard, rigid thermoplastic material. Cord clamping section 34 has a first fixed member 60 and a pair of second movable clamping members 62 which are movably coupled to the fixed member 60 via a pair of screws 64 and nuts 66. Cord clamping section 34 is designed to provide strain relief to the connections between electrical conductors 22 and electrical contacts 18. More specifically, cord clamp section 34 grips electrical cord 20 so that when a pulling force is applied to electrical cord 20, the pulling force is not transmitted to the connection of electrical connectors 22 to electrical contacts 18.

As seen in FIG. 2, cord seal 36 is preferably an elastomeric seal which is sandwiched between second end 40 of center section 28 and cord clamping section 34. Cord seal 36 is doughnut-shaped with a center hole for receiving electrical cord 20 therethrough. When fixed member 60 is coupled to second end 40 of center section 28 via screws 42, cord seal 36 is compressed therebetween. This compression of cord seal 36 causes cord seal to deform and create a sealing action against the cord 20 and center section 28.

Figure 5:
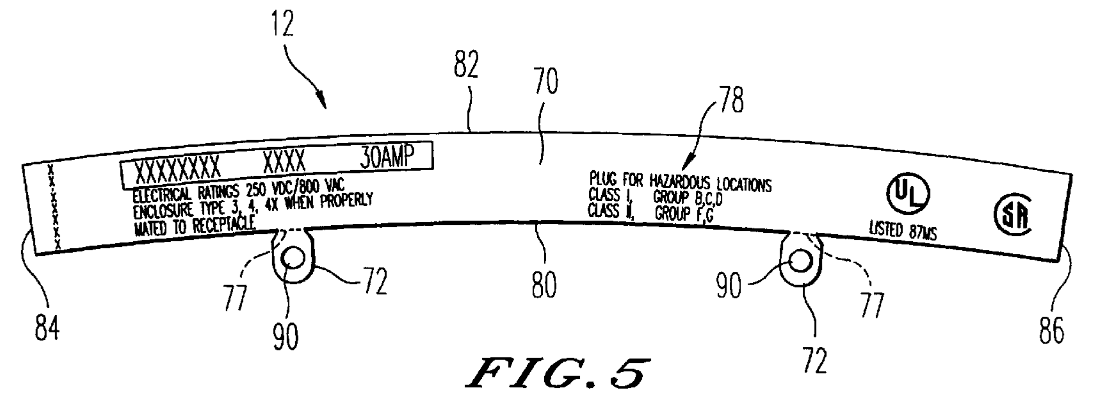
FIG. 5 is a top plan view of the nameplate for the electrical plug illustrated in FIGS. 1 and 2, prior to installation.
Figure 6:
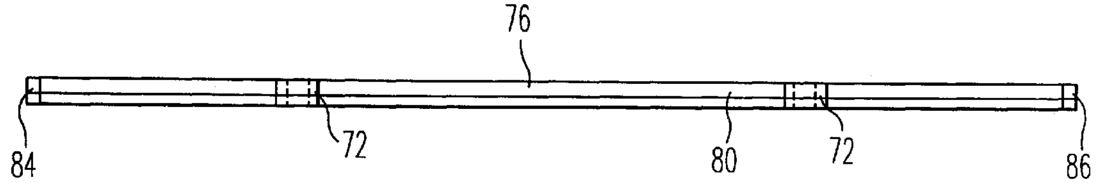
FIG. 6 is a side edge elevational view of the nameplate of FIG. 5 for the electrical plug illustrated in FIGS. 1 and 2, with the thicknesses of the layers being exaggerated for purposes of illustration.

Referring now to FIGS. 3–6, nameplate 12 basically includes a curved label section 70, which is designed to overlie the frustoconical surface 48 of center section 28 of housing 14, and a pair of mounting sections or tabs 72, which are designed to overlie the axial face of second end 40 of center section 28. Mounting tabs 72 are coupled to curved label section 70 at spaced locations. Preferably, curved label section 70 and tabs 72 are integrally constructed as a one-piece, unitary member with one side coated with an adhesive layer 74 as seen in FIG. 6. Preferably, label section 70 and tabs 72 are constructed of a non-conductive, dielectric material such as a polyester film which is produced by Du Pont. Preferably, the polyester film or layer 76 is approximately 0.003 inch thick.

Tabs 72 are coupled to label section 70 by a pair of folding sections 77 which are preferably reduced areas located between tabs 72 and label section 70. Reduced areas or folding sections 77 are designed to permit tabs 72 to be folded relative to label section 70 for overlying the axial end face of second open end 40. It will be apparent to those skilled in the art that reduced areas 77 can be provided with a fold line to further assist in folding tabs 72 relative to label section 70. Of course, a fold line can also be used instead of reduced areas 77. The term "fold line" as used herein refers to any structure which creates a fold in the nameplate such as, but not limited to a crease or a fold.

Nameplate 12 has a first side with indicia 78 imprinted thereon. This indicia 78 should include all information required by Underwriters Laboratories (UL) and Canadian Standards Association (CSA) as well as any additional information which the manufacturer or the consumer desires. Preferably, the label 12 includes rating information, manufacturer information, part number, the UL marking and the CSA marking as seen in FIG. 5.

The other side of nameplate 12, opposite the indicia, is preferably coated with an adhesive layer 74 for securing nameplate 12 to center section 28 of housing 14. The adhesive layer 74 is preferably a pressure sensitive adhesive which is thermally laminated onto the layer 76. The pressure sensitive adhesive can be a continuous layer or a spot coating. Accordingly, the label should be able to be used in both indoor and outdoor locations. In particular, the second side of the label section 70 of nameplate 14 overlies the frustoconical surface 48 of center section 28 of housing 14, while the mounting tabs 72 overlie the end surface of second end 40 of center section 28 such that they overlie the screw holes which receive screws 54 to secure nameplate 12 center section 28 of housing 14. Preferably, the adhesive layer 74 is approximately 0.01 inch thick. The adhesive layer 74, together with the layer 76 creates a label or nameplate 12 which is approximately 0.004 inch thick.

Curved label section 70 has a first side edge 80, a second side edge 82, a first end edge 84 and a second end edge 86. Side edges 80 and 82 are preferably curved edge with the distance between the side edges 80 and 82 being at least approximately 0.50 inch, preferably 0.585 inch. The curvature of side edges 80 and 82 will depend upon the slope of frustoconical section 48 of center section 28 of housing 14. In particular, when nameplate 12 is wrapped about frustoconical surface 48, label section 70 of nameplate 14 forms a frustoconical label having substantially the same slope as frustoconical surface 48.

Preferably, the length of label or nameplate 12 between first and second end edges 84 and 86 is such that when curved label section 70 is wrapped around frustoconical surface 48 of center section 28 of housing 14. The end edges 84 and 86 substantially abut each other. In other words, label section 70 extends approximately 360° about frustoconical surface 48 of center section 28. Of course, label section 70 can be constructed to extend less than 360° such that the end edges 84 and 86 do not meet. Of course, label or nameplate 12 can be constructed to extend more than 360° such that end edges 84 and 86 are circumferentially spaced from each other and overlap a portion of label section 70.

Tabs 72 each have a mounting hole 90 formed therein for receiving screws 54 therethrough to permanently secure nameplate 12 to the end of second end 40 of center section 28 of housing 14. Tabs 72 extend from first side edge 80 and are preferably spaced 180° apart when coupled to the second end 40 of center section 28 such that label section 70 overlies frustoconical surface 48 of center section 28.

The mounting tabs 72 are coupled to the first side edge 80 of curved label section 70 by a reduced portion or area 77 which forms a fold line for bending tabs 72 substantially perpendicular to curved label section 70. Of course, since curved label section 70 is frustoconical, the angle between tabs 72 and curved label section 70 is preferably slightly larger than 90°. Of course, if nameplate 12 was to be secured to a cylindrical portion of an electrical connector, the side edges 80 and 82 would be straight and parallel to each other, instead of curved, such that when label section 70 is wrapped around a cylindrical housing, a cylindrical nameplate is formed.

Second Embodiment

Figure 9:
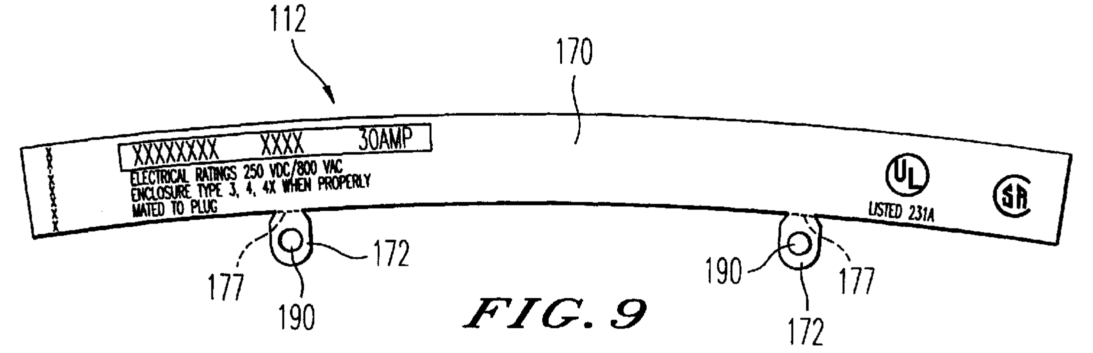
FIG. 9 is a top plan view of the nameplate for the electrical connector illustrated in FIGS. 7 and 8.
Figure 7:
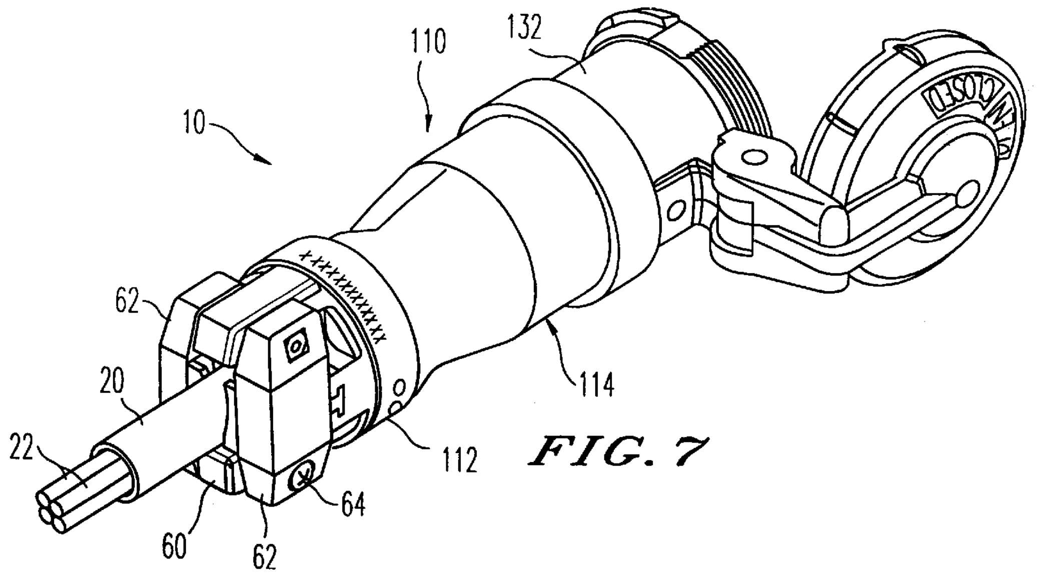
FIG. 7 is a rear end perspective view of an electrical connector with a nameplate or label coupled thereto in accordance with a second embodiment of the present invention.
Figure 8:
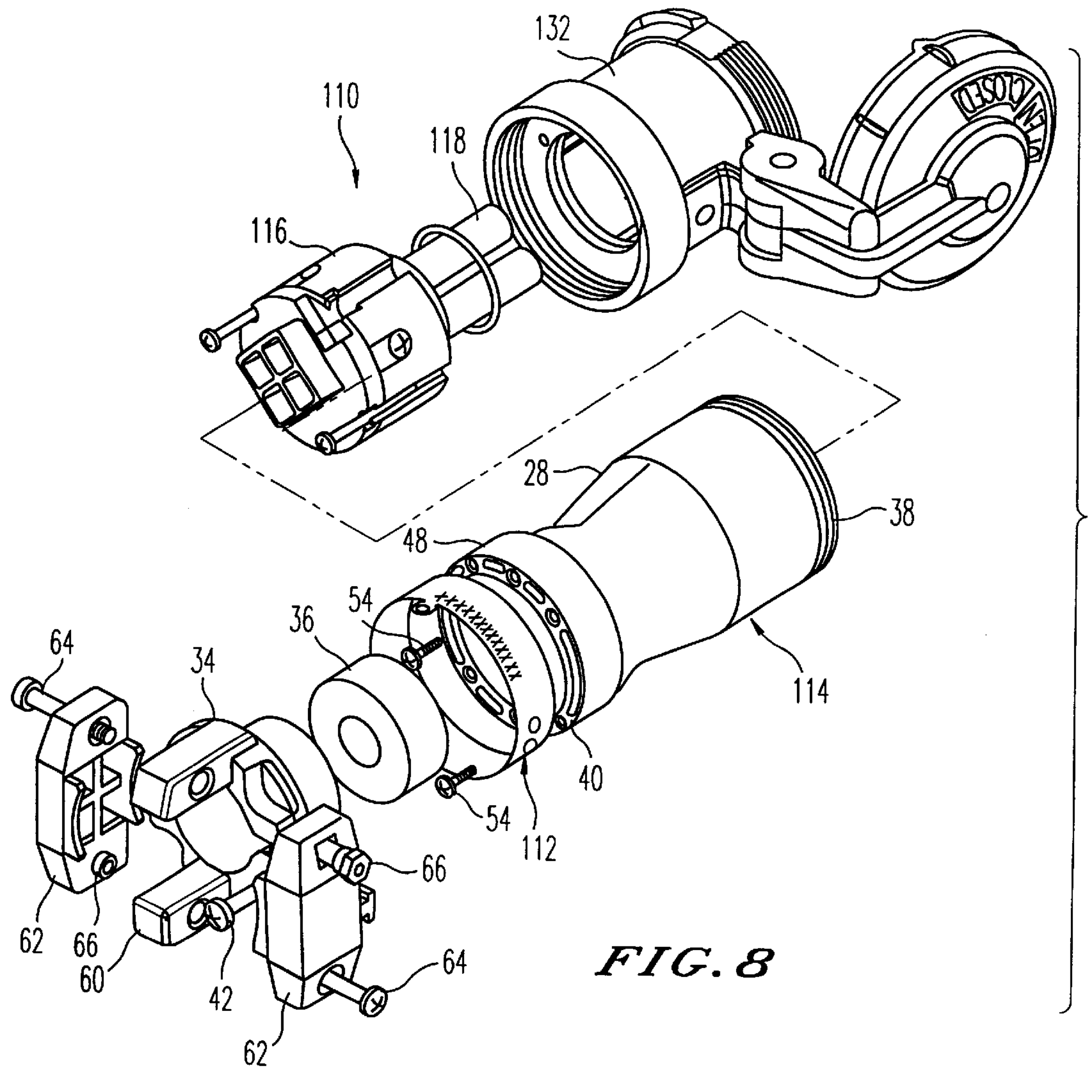
FIG. 8 is an exploded rear perspective view of the electrical connector illustrated in FIG. 7.

Referring now to FIGS. 7–9, an electrical connector 110 with a nameplate or label 112 is illustrated in accordance with a second embodiment of the present invention. Electrical connector 110 is especially designed for hazardous locations and is substantially identical to electrical plug 10. Since some of the parts are identical between connectors 110 and electrical plug 10 of the first embodiment, similar parts will be given the same reference numeral. For example, electrical connector 110 utilizes tubular center section 28, cord clamping section 34 and moisture seal 36 of the first embodiment. In view of the similarities between the second embodiment and the first embodiment, this second embodiment will not be discussed and/or illustrated in detail herein. Rather, it will be apparent to those skilled in the art from this disclosure that the description of the first embodiment applies to the second embodiment to the extent that it does not conflict therewith.

Basically, electrical connector 110 includes a housing 114, a contact retainer body 116 secured within housing 114 and a set of electrical contacts 118 retained within contact retainer body 116. As seen in FIG. 8, housing 114 includes a tubular center section 28, a shroud section 132, a cord clamping section 34 and a moisture seal 36.

Referring to FIG. 9, nameplate 112 is basically identical to nameplate 12, and includes a curved label section 170, which is designed to overlie the frustoconical surface 48 of center section 28 of housing 114, and a pair of mounting sections or tabs 172, which are designed to overlie the axial face of second end 40 of center section 28. Mounting tabs 172 are coupled to curved label section 170 at spaced locations. Preferably, curved label section 170 and tabs 172 are integrally constructed as a one-piece, unitary member with one side coated with an adhesive layer.

Tabs 172 are coupled to label section 170 by a pair of folding sections 177 which are preferably reduced areas located between tabs 172 and label section 170. Reduced areas or folding sections 177 are designed to permit tabs 172 to be folded relative to label section 170 for overlying the axial end face of second open end 40. Holes 190 in tabs 172 receive screws 54 for mechanically securing nameplate 112 to housing 114. It will be apparent to those skilled in the art that reduced areas 177 can be provided with a fold line to further assist in folding tabs 172 relative to label section 170. Of course, a fold line can also be used instead of reduced areas 177.

Nameplate 112 should include all information required by Underwriters Laboratories (UL) and Canadian Standards Association (CSA) as well as any additional information which the manufacturer or the consumer desires. Preferably, the label 112 includes rating information, manufacturer information, part number, the UL marking and the CSA marking as seen in FIG. 9.

Various modifications, improvements and other embodiments will become apparent to those skilled in the art once given this disclosure. Such modifications, improvements and other embodiments are considered to be within the scope and spirit of this invention as defined by the following claims.

What is claimed is:

1. A nameplate for an electrical device comprising:

a nonconductive, plastic dielectric layer having a first side with product identifying indicia thereon, a second side for engaging the electrical device and at least one mounting hole extending between said first and second sides, said dielectric layer including a label section with said product identifying indicia thereon, a mounting section with said mounting hole being formed therein and folding section connecting said mounting section to said label section; and adhesive overlying said second side of said label section of said dielectric layer for attaching said dielectric layer to an exterior surface of the electrical device.

2. A nameplate for an electrical device according to claim 1, wherein said dielectric layer is constructed of polyester film having a thickness of about 0.003 inch between said first and second sides.

3. A nameplate for an electrical device according to claim 1, wherein said label section of said dielectric layer has a pair of curved side edges extending in a substantially longitudinal direction.

4. A nameplate for an electrical device according to claim 1, wherein said label section of said dielectric layer has first and second longitudinally extending side edges with said first side edge having said mounting section formed thereon.

5. A nameplate for an electrical device according to claim 4, wherein said mounting section is formed by a pair of outwardly extending tabs with said at least one mounting hole being formed each of said tabs.

6. A nameplate for an electrical device according to claim 5, wherein said first and second side edges are curved.

7. A nameplate for an electrical device according to claim 6, wherein said first side edge has a curvature with a smaller radius than said second side edge.

8. A nameplate for an electrical device according to claim 5, wherein said folding section is formed by a pair of reduced areas connecting said tabs to said label section.

9. A nameplate for an electrical device according to claim 1, wherein said mounting section is formed by a pair of outwardly extending tabs with said at least one mounting hole being formed each of said tabs.

10. A nameplate for an electrical device according to claim 1, wherein said folding section is formed by at least one reduced area connecting said mounting section to said label section.

11. A nameplate for an electrical device comprising:

a dielectric layer having a first side with product identifying indicia thereon, a second side for engaging the electrical device and at least one mounting hole extending between said first and second sides, said dielectric layer including a label section with said product identifying indicia thereon, a mounting section with said mounting hole being formed therein and folding section connecting said mounting section to said label section, said label section of said dielectric layer having a pair of curved side edges extending in a substantially longitudinal direction; and adhesive overlying said second side of said label section of said dielectric layer for attaching said dielectric layer to an exterior surface of the electrical device.

12. A nameplate for an electrical device according to claim 11, wherein said dielectric layer is constructed of polyester film having a thickness of about 0.003 inch between said first and second sides.

13. A nameplate for an electrical device according to claim 11, wherein said label section of said dielectric layer has first and second longitudinally extending side edges with said first side edge having said mounting section formed thereon.

14. A nameplate for an electrical device according to claim 13, wherein said mounting section is formed by a pair of outwardly extending tabs with said at least one mounting hole being formed each of said tabs.

15. A nameplate for an electrical device according to claim 14, wherein said first and second side edges are curved.

16. A nameplate for an electrical device according to claim 15, wherein said first side edge has a curvature with a smaller radius than said second side edge.

17. A nameplate for an electrical device according to claim 14, wherein said folding section is formed by a pair of reduced areas connecting said tabs to said label section.

18. A nameplate for an electrical device according to claim 11, wherein said mounting section is formed by a pair of outwardly extending tabs with said at least one mounting hole being formed each of said tabs.

19. A nameplate for an electrical device according to claim 11, wherein said folding section is formed by at least one reduced area connecting said mounting section to said label section.

20. A nameplate for an electrical device comprising:

a dielectric layer having a first side with product identifying indicia thereon, a second side for engaging the electrical device and at least one mounting hole extending between said first and second sides, said dielectric layer including a label section with said product identifying indicia thereon, a mounting section with said mounting hole being formed therein and folding section connecting said mounting section to said label section, said label section of said dielectric layer has first and second longitudinally extending side edges with said first side edge having said mounting section formed thereon; and adhesive overlying said second side of said label section of said dielectric layer for attaching said dielectric layer to an exterior surface of the electrical device.

21. A nameplate for an electrical device according to claim 20, wherein said dielectric layer is constructed of polyester film having a thickness of about 0.003 inch between said first and second sides.

22. A nameplate for an electrical device according to claim 20, wherein said mounting section is formed by a pair of outwardly extending tabs with said at least one mounting hole being formed each of said tabs.

23. A nameplate for an electrical device according to claim 22, wherein said first and second side edges are curved.

24. A nameplate for an electrical device according to claim 23, wherein said first side edge has a curvature with a smaller radius than said second side edge.

25. A nameplate for an electrical device according to claim 22, wherein said folding section is formed by a pair of reduced areas connecting said tabs to said label section.

26. A nameplate for an electrical device according to claim 20, wherein said folding section is formed by at least one reduced area connecting said mounting section to said label section.

27. A nameplate for an electrical device comprising:

a dielectric layer having a first side with product identifying indicia thereon, a second side for engaging the electrical device and at least one mounting hole extending between said first and second sides, said dielectric layer including a label section with said product identifying indicia thereon, a mounting section with said mounting hole being formed therein and folding section connecting said mounting section to said label section, said mounting section is formed by a pair of outwardly extending tabs with said at least one mounting hole being formed on each of said tabs; and adhesive overlying said second side of said label section of said dielectric layer for attaching said dielectric layer to an exterior surface of the electrical device.

28. A nameplate for an electrical device according to claim 27, wherein said dielectric layer is constructed of polyester film having a thickness of about 0.003 inch between said first and second sides.

29. A nameplate for an electrical device according to claim 27, wherein said first and second side edges are curved.

30. A nameplate for an electrical device according to claim 27, wherein said first side edge has a curvature with a smaller radius than said second side edge.

31. A nameplate for an electrical device according to claim 27, wherein said folding section is formed by a pair of reduced areas connecting said tabs to said label section.

32. A nameplate for an electrical device according to claim 27, wherein said folding section is formed by at least one reduced area connecting said mounting section to said label section.

33. A nameplate for an electrical device comprising:

a dielectric layer having a first side with product identifying indicia thereon, a second side for engaging the electrical device and at least one mounting hole extending between said first and second sides, said dielectric layer including a label section with said product identifying indicia thereon, a mounting section with said mounting hole being formed therein and folding section connecting said mounting section to said label section, said folding section being formed by at least one reduced area connecting said mounting section to said label section; and adhesive overlying said second side of said label section of said dielectric layer for attaching said dielectric layer to an exterior surface of the electrical device.

34. A nameplate for an electrical device according to claim 33, wherein said dielectric layer is constructed of polyester film having a thickness of about 0.003 inch between said first and second sides.

35. A nameplate for an electrical device according to claim 33, wherein said mounting section is formed by a pair of outwardly extending tabs with said at least one mounting hole being formed each of said tabs.

36. A nameplate for an electrical device according to claim 35, wherein said first and second side edges are curved.

37. A nameplate for an electrical device according to claim 36, wherein said first side edge has a curvature with a smaller radius than said second side edge.

38. A nameplate for an electrical device according to claim 35, wherein said folding section is formed by a pair of reduced areas connecting said tabs to said label section.

* * * * *